Aug. 16, 1938.　　　H. PAXTON　　　2,127,007
STACK DUMPER
Filed Sept. 24, 1935　　　4 Sheets-Sheet 1
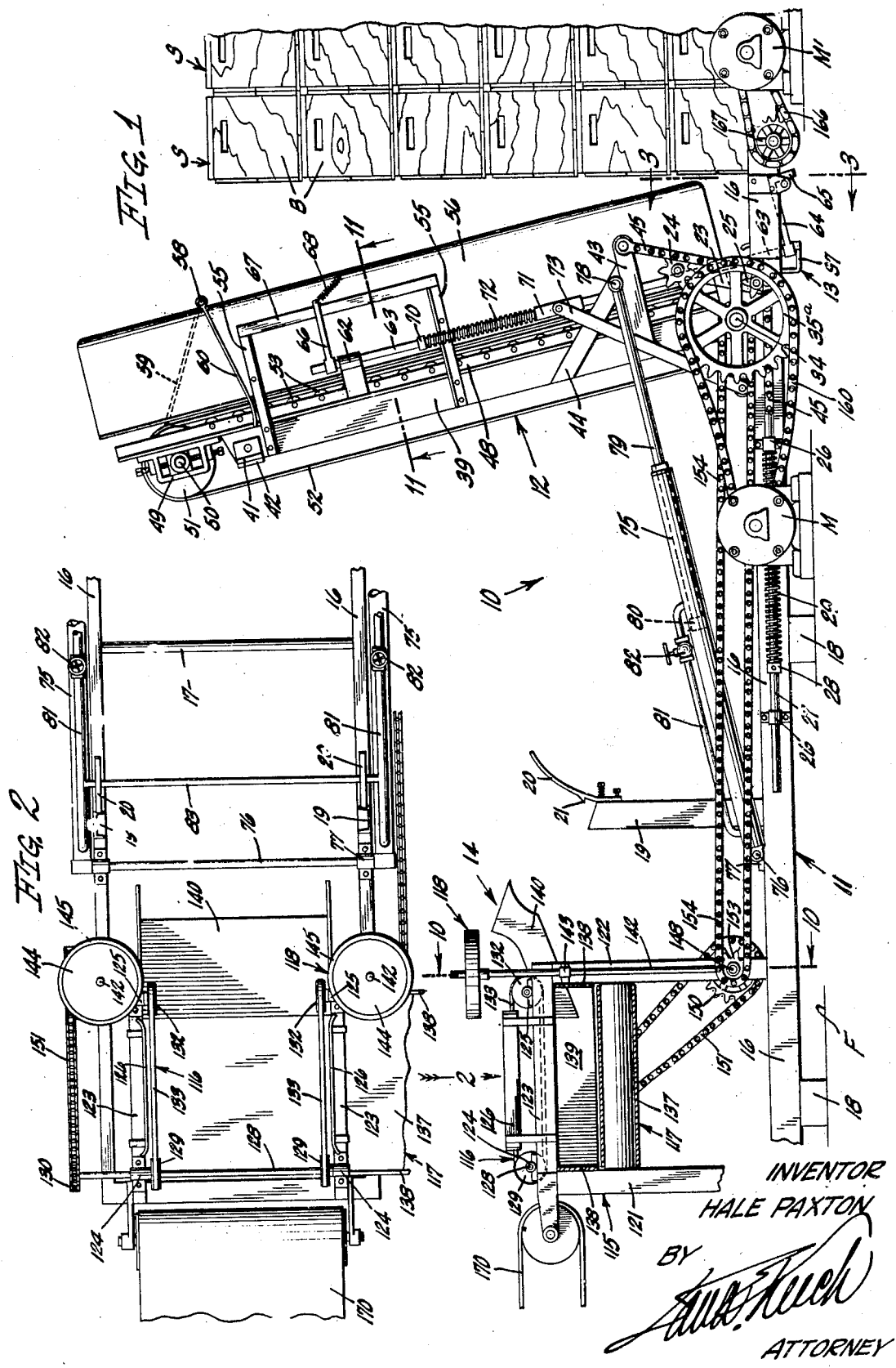
INVENTOR
HALE PAXTON
BY
ATTORNEY

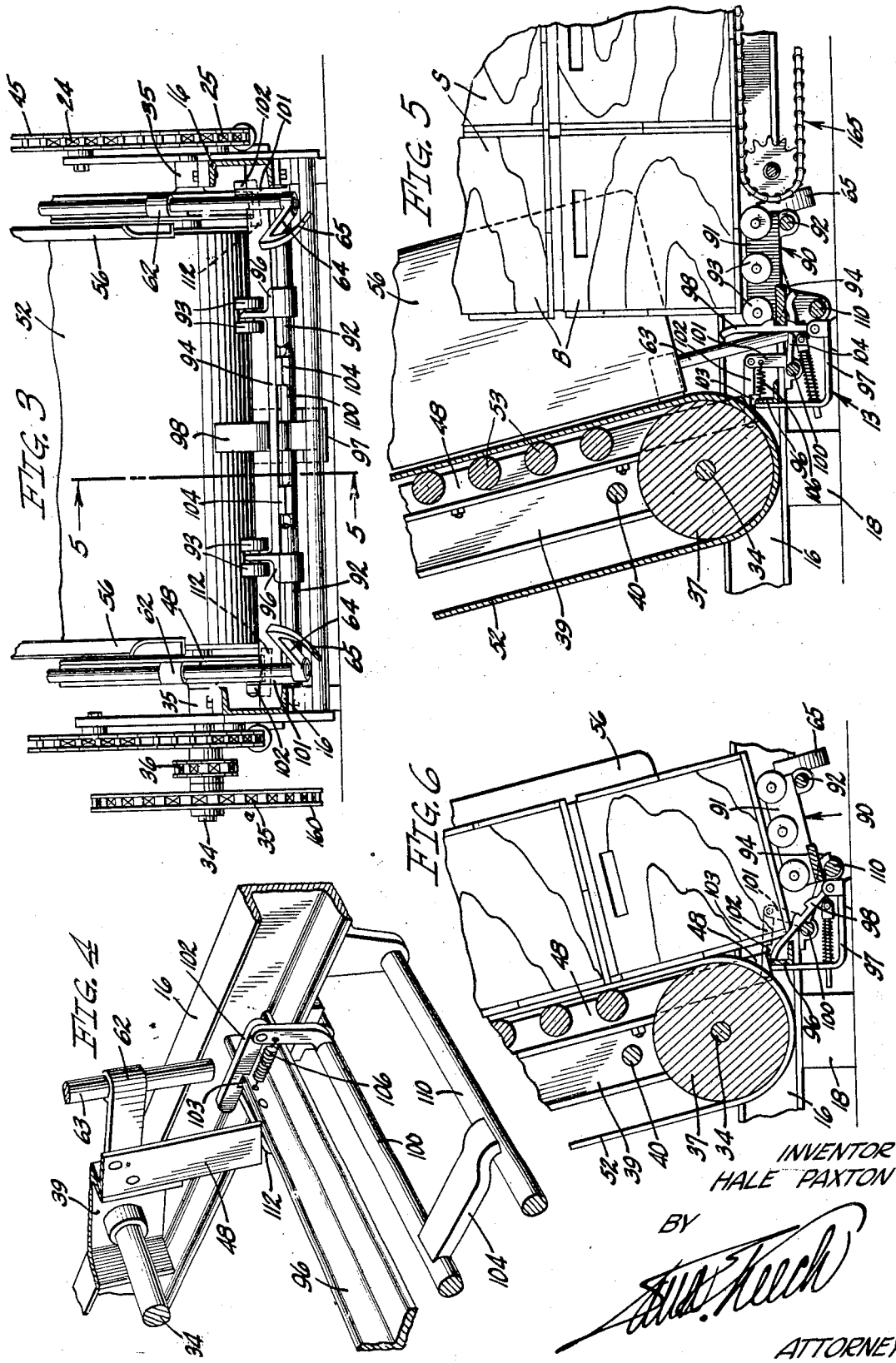

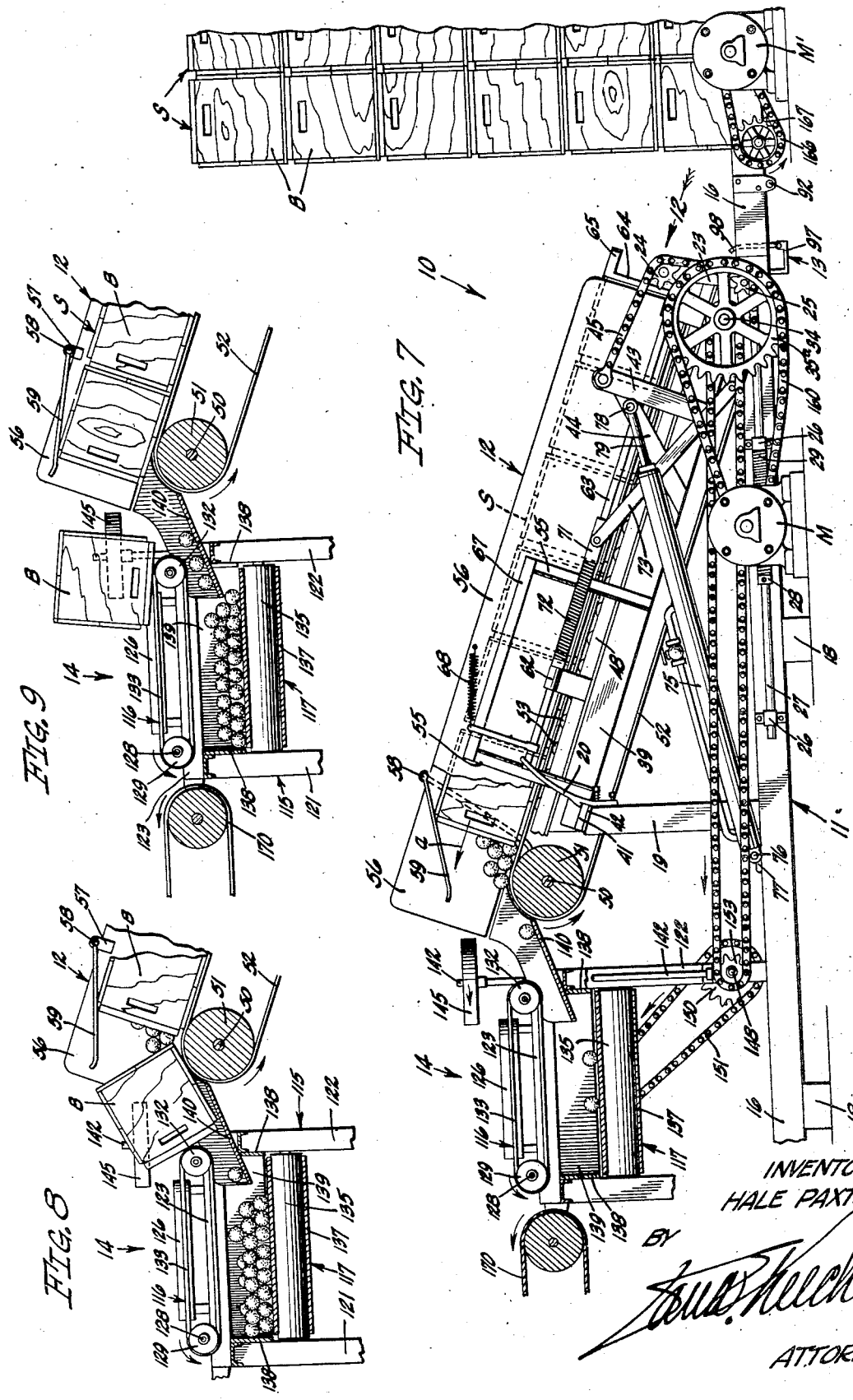

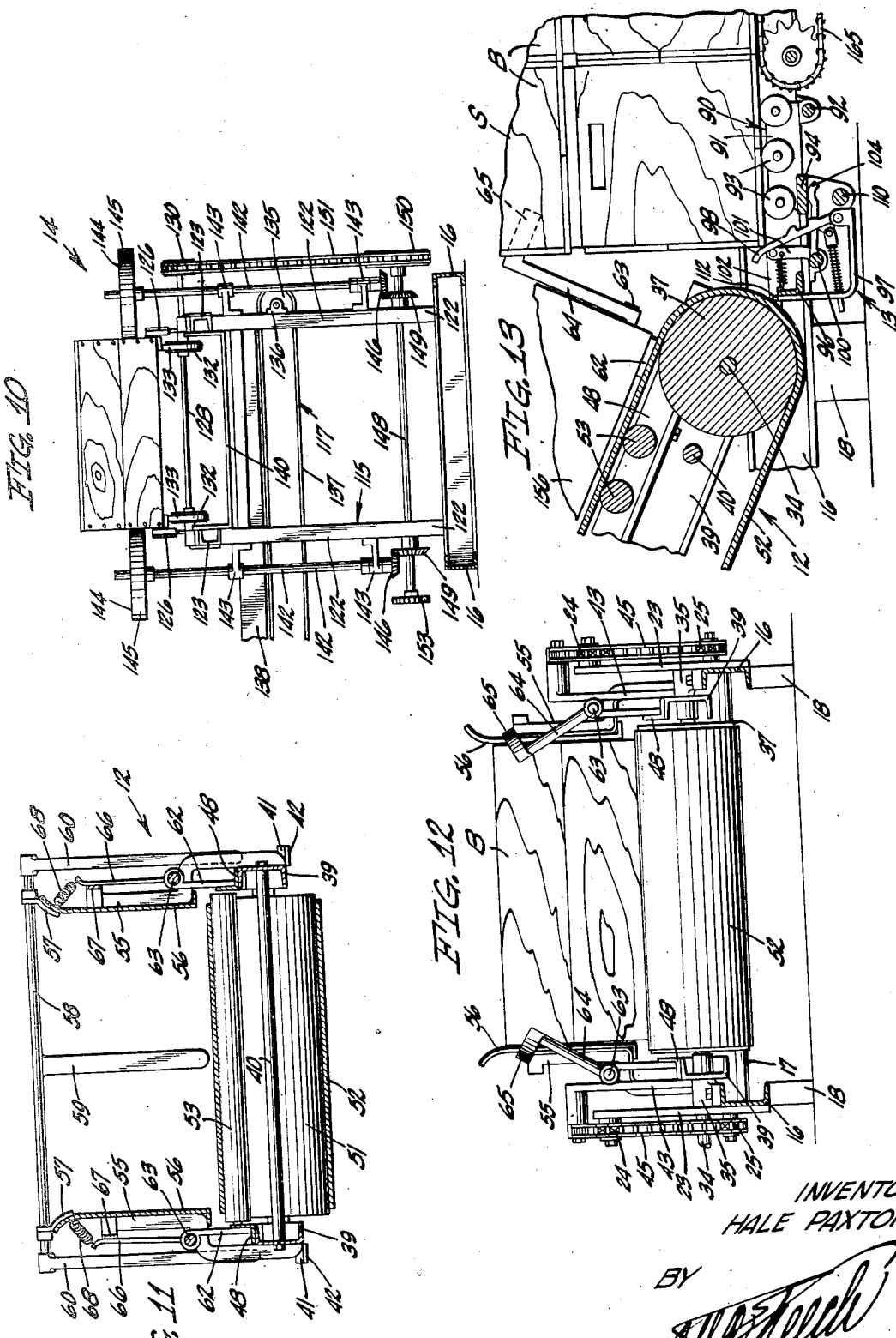

Patented Aug. 16, 1938

2,127,007

UNITED STATES PATENT OFFICE 2,127,007

STACK DUMPER

Hale Paxton, Santa Ana, Calif., assignor, by mesne assignments, to Food Machinery Corporation, a corporation of Delaware Application September 24, 1935, Serial No. 41,897

20 Claims. (Cl. 214—1.1)

My invention relates to the art of dumping the contents from loaded containers and has particular utility in the citrus industry in handling stacks of loaded field boxes and dumping the fruit from each box in the stack.

Citrus fruits when picked from the trees are placed in heavily constructed containers known as "field boxes", in which the fruit is transported from the groves to the packing house where it remains in these field boxes for temporary storage with the latter piled up in stacks, usually of six boxes each, until the time arrives for preparing and packing the fruit for shipment. When that time arrives, the stacks of field boxes have to be unstacked and the fruit dumped from each box onto a conveyor which carries it to the first of a series of soaking, washing, drying and polishing units by which the fruit is prepared for final packing into shipping boxes.

The machines in present use for unpacking field boxes and dumping the fruit therefrom, are commonly known as "stack dumpers". These machines receive each stack of boxes and elevate it upwardly, each box of the stack being received therefrom and dumped by special dumping apparatus when it reaches a certain elevation. Because of the height of these stacks and the mode of operation of these machines, it becomes necessary to perform the dumping operation on the floor above that on which the machine is located and on which it receives the stack. This greatly limits the utility of the old type of stack dumpers as in many of the packing houses facilities are lacking for two floor operation as above outlined.
In such houses, however, the problem still remains of finding some means of breaking down the stack of boxes incidental to emptying the fruit therefrom.

It is accordingly an object of my invention to provide a stack dumper which receives a stack of boxes on a given floor, breaks this down and delivers the fruit from each of the boxes thereof to apparatus operating on the same floor. In old stack dumpers, it was necessary to provide a pit in the floor on which the stack dumper was installed to contain a considerable quantity of the operating mechanism of the dumper. This of course made any installation of one of these old stack dumpers a rather permanent affair and also made this quite expensive.

It is a further object of my invention to provide a stack dumper, the operating mechanism of which is disposed entirely above the level of the floor on which it rests, thereby eliminating the necessity of a pit being provided in the floor to accommodate a portion of the mechanism of the device and permitting the location of the dumper on the floor to be changed comparatively easily.

Other objects of my invention have to do with the provision of a stack dumper which is inexpensive to manufacture, easy to install, of long life, and one which is efficient in operation and requires a relatively small amount of power to operate the same.

Other objects and advantages will be made manifest in the following description, taken in connection with the accompanying drawings, in which:

Fig. 1 is a side elevational view of a preferred embodiment of my invention.

Fig. 2 is a fragmentary plan view looking in the direction of the arrow 2 of Fig. 1.

Fig. 3 is an enlarged, vertical sectional view taken on the line 3—3 of Fig. 1.

Fig. 4 is a fragmentary perspective view of a portion of the mechanism shown in Fig. 3.

Fig. 5 is a vertical sectional view taken on the line 5—5 of Fig. 3.

Fig. 6 is a sectional view similar to Fig. 5, showing the operation of the mechanism thereof.

Fig. 7 is a side elevational view partly in section showing the dumping position of the machine shown in Fig. 1.

Figs. 8 and 9 are fragmentary, vertical sectional views showing successive stages in the operation of the mechanism disclosed therein.

Fig. 10 is a vertical sectional view taken on the line 10—10 of Fig. 1.

Fig. 11 is an enlarged, cross sectional view taken on the line 11—11 of Fig. 1.

Fig. 12 is an end elevational view looking in the direction of the arrow 12 of Fig. 7.

Fig. 13 is a sectional view similar to Fig. 5, showing the operation of a portion of the mechanism shown therein.

Referring specifically to the drawings, a stack dumping machine 10 comprising a preferred embodiment of my invention is shown in Fig. 1, this machine including a base 11, a stack receiver 12, a stack inclining mechanism 13 and a box inverting unit 14.

Base 11

The base 11 includes a pair of parallel channel bars 15 connected in spaced relation by tie rods 17 and supported above a floor F by blocks 18. Extending upward from each of the bars 16, as shown in Figs. 1 and 2, is channel iron post 19. Mounted on the upper end of each of the posts 19 is a spring pressed arm 20 having a latch tooth 21 formed thereon. Extending upward from each of the bars 16, as shown in Figs. 1 and 3, is a plate 23 having idle sprockets 24 and 25 rotatably mounted thereon; the purpose of the sprockets 24 and 25 will be described hereinafter. Slidable horizontally in bearings 26 provided on the outer faces of the bars 16 are shafts 27, each of the latter having a fixed collar 28 and a heavy compression spring 29 provided thereon.

Stack receiver 12

The stack receiver 12 includes a shaft 34 journalled in bearings 35 on the bars 16 as shown in Figs. 3 and 12. Fixed on one end of the shaft 34 are large and small sprockets 35a and 36 respectively, and secured on the shaft 34 between the bearings 35 is a pulley 37. Rockably mounted on the shaft 34 adjacent the ends of the pulley 37 are channel iron bars 39 secured together in spaced relation by tie rods 40 as shown in Figs. 5 and 11. Fixed on each of the channel bars 39 adjacent the upper ends thereof is an outward extending angle bracket 41 having a rubber pad 42 on the face thereof as seen in Fig. 1. Welded, or otherwise secured on the outer faces of the channel bars 39 are arms 43 having diagonal braces 44 fixed thereto. Fixed to the extremity of each of the arms 43 is one end of a chain 45, the latter being trained about the sprockets 24 and 25 and secured at its opposite end to one end of the bar 27 of the base 11.

Mounted on the channel iron bars 39 of the stack receiver 12 are angle bars 48, the ends of which extend beyond the extremities of the bars 39 as seen in Figs. 1 and 4. Bolted to the upper, overhanging portions of the angle bars 48 are adjustable bearings 49 in which trunnions 50 of an idle pulley 51 are journalled. Trained about the pulleys 51 and 37 is an endless belt or draper 52, the upper flight of which is supported on rollers 53 journalled at their ends in the angle bars 48 as shown in Figs. 1 and 11.

Secured to the channel bars 39 of the stack receiver 12 are offset arms 55 to which side plates 56 are secured. As shown in Fig. 11, apertured ears 57 are provided on the side plates 56 for rotatably receiving a rod 58, the latter having an arm 59 provided centrally thereon and arms 60 on the extremities thereof. Slidably mounted on each side of the stack receiver 12, in bearings 62 provided on the angle bars 48, is a shaft 63 having an arm 64 on the lower end thereof, each of the arms 64 having an arcuate lateral extension 65 thereon as shown in Figs. 3 and 12. Fixed on the opposite end of each of the shafts 63 is an arm 66, the extremity of which is urged against a bar 67 provided on the offset arms 55 by an extension spring 68, as shown in Figs. 1 and 11. Provided on the shafts 63 are fixed collars 70 and sliding sleeves 71 between which compression springs 72 are mounted. Pivotally connected to the sleeve 71 of each of the shafts 63 is one end of a connecting rod 73, the opposite end thereof being pivotally mounted on one of the bars 16 of the base 11 as shown in Fig. 1.

Movement of the stack receiver 12 from the position in which it is shown in Fig. 1 to that shown in Fig. 7 is controlled by a pair of hydraulic cylinders 75, the lower ends of which are fixed to a shaft 76 rotatably mounted in bearings 77 on the channels 16. Extending from a wrist pin 78 on the diagonal braces 44 into the upper ends of the cylinders 75 are rods 79 having pistons 80 on the ends thereof as shown in Fig. 1.

Provided on each of the cylinders 75 is a by-pass pipe 81 having a valve 82 therein, the pipes 81 serving to connect the lower portions of the cylinders 75 with the portions thereof above the pistons 80. Connecting the pipes 81, as seen in Fig. 2, is a pressure equalizing pipe 83.

Stack inclining mechanism 13

The mechanism 13, shown in Figs. 3 to 6 inclusive, includes an idle stack conveyor 90 comprising a pair of angle iron bars 91 pivotally mounted on a shaft 92 extending between the channel bars 16 of the base 11. Mounted on the bars 91 are rollers 93, the bars 91 being joined in spaced relation by a bar 94. Secured at its opposite ends to the channel iron bars 16 is an angle bar 96 having an L-shaped bracket 97 mounted centrally thereon. Pivoted on the extremity of the bracket 97 is a spring pressed latch arm 98 for normally retaining the conveyor 90 in horizontal position as shown in Fig. 5. Rotatably mounted between the bars 16 adjacent the angle iron bar 96 is a shaft 100 having upstanding arms 101 fixed on opposite ends thereof as shown in Fig. 3. Pivoted on the extremities of the arms 101 are fingers 102 having notches 103 for engagement with the upper edge of the angle iron bar 96 in a manner to be described hereinafter.

Extending from the shaft 100 to the under side of the bar 94 of the conveyor 90 is a pair of arms 104. The shaft 100 is normally urged to the position in which it is shown in Fig. 5 by extension springs 106 extending from the arms 101 to the angle iron bar 96.

Hung below the bars 16 is a transverse bar 110 for limiting the downward movement of the conveyor 90 as shown in Fig. 6. Pivotally mounted on each end of the angle iron bar 96, as shown in Figs. 3 and 4 is a lever 112, one end of which extends under the extremity of the finger 102 while the opposite end thereof is disposed in position to contact the lowermost extremity of the angle bars 48 of the stack receiver 12.

Box inverting unit 14

The unit 14 includes an empty box conveyor 116, a fruit conveyor 117 and a box inverting mechanism 118. The frame 115 includes corner posts 121 and 122 extending upward from the base 11. Fixed on the upper ends of the posts 121 and 122 are horizontal bars 123 having pairs of bearings 124 and 125 mounted thereon, as shown in Fig. 2.

The conveyor 116 includes guide rails 126 mounted above the bars 123. Journalled in the bearings 124 is a shaft 128 having a pair of V-belt pulleys 129 fixed thereon, and a sprocket 130 on one end thereof. Rotatably mounted on suitable pins provided in the bearings 125 are pulleys 132, there being endless V-belts 133 trained about the pulleys 129 and 132.

The fruit conveyor 117, a portion of which is shown in Fig. 10, includes a pulley 135 rotatably mounted on bearings 136 provided on one pair of the posts 121 and 122 of the frame 115. Trained about the idle pulley 135 and a similar but power driven pulley (not shown) is an endless fruit conveyor belt 137. Mounted on the posts 121 and 122 and disposed at opposite sides of the belt 137 are plates 138 for retaining fruit on the conveyor 117, and extending between the posts 121 and 122 above the pulley 135 is a plate 139. Mounted at one side of the unit 14, as shown in Fig. 7, is a chute 140 for delivering fruit from the stack receiver 12 to the fruit conveyor 117.

The box inverting mechanism 118 includes a pair of vertical shafts 142 journalled in bearings 143 as shown in Fig. 10. Fixed on upper ends of the shafts 142 are discs 144 having rubber tires 145 mounted thereon, and fixed on the lower ends of the shafts 142 are bevel gears 146. The empty box conveyor 116 and box inverting mechanism 118 are driven by a drive shaft 148 journalled on the posts 122 of the frame 115. Secured on the shaft 148 in meshing relation with the bevel gears 146 are gears 149. Mounted on one end of the shaft 148 is a sprocket 150 aligned with the sprocket 130 of the shaft 128, there being a chain 151 trained about the sprockets 130 and 150. Fixed on the opposite end of the shaft 148 is a sprocket 153 aligned with the aforementioned sprocket 36 of the shaft 34, the sprockets 36 and 153 being connected by an endless chain 154. Mounted on the frame 115 of the box inverting unit 14 is a conveyor 156 for receiving empty boxes from the conveyor 116.

Operation

The stack receiver 12 of the machine 10 is normally positioned as shown in Fig. 1, the shaft 34 thereof being driven continuously by a chain 160, the latter extending from a motor M to the sprocket 35a. Stacks S of loaded field boxes B, as shown in Fig. 1, are conveyed to the conveyor 90 of the stack inclining mechanism 13 by a conventional chain conveyor 165, a portion of which is shown in Fig. 5. The stack conveyor 165 is driven continuously at a relatively slow speed by a chain 166 extending from a sprocket 167 to a suitable motor M' as shown in Fig. 1.

When one of the stacks S is delivered onto the idle conveyor 90 by the power conveyor 165, the lowermost box B of the stack pushes the latch arm 98 out of engagement with the bar 94 allowing the conveyor 90 to drop from the horizontal position in which it is shown in Fig. 5 to the inclined position shown in Fig. 6, the downward movement of the conveyor 90 being limited by the bar 110. Inclination of the conveyor 90 causes the stack S thereon to fall from vertical position into the stack receiver 12. The weight and momentum of the stack of boxes as this is received by the receiver 12 causes the latter to swing downward from the position in which it is shown in Fig. 1, to that shown in Fig. 7. The hydraulic cylinders 75 prevent the stack receiver 12 from swinging downward too rapidly, it being noted that by adjusting the valves 82 of the bypass pipes 81, the receiver 12 can be caused to fall at any desirable rate of speed.

As the stack receiver 12 falls, the connecting rod 73 forces the sleeve 71 against the spring 72 causing the shaft 63 to slide upward in the bearings 62. Upward movement of the shaft 63 brings the arms 64 thereof against the under side of the lowermost box B of the stack S in the stack receiver 12. When the stack receiver 12 is disposed in the position shown in Fig. 7, the conveyor belt 52 carries the stack S in the direction indicated by the arrow a of Fig. 7, the lowermost box B being lifted onto the belt 52 as the arms 64 move to the position in which they are shown in Fig. 13.

Downward movement of the receiver 12 causes the chain 45 connected to the arms 43 to slide the shaft 27 rightward as viewed in Fig. 7, thus compressing the spring 29 between the collar 28 and bearing 26. Downward movement of the receiver 12 is stopped by contact of the angle brackets 41 with the upper ends of the posts 19, the tooth 21 of the arm 20 engaging the bracket 41 so as to retain the stack receiver 12 in lowered position in which it is shown in Fig. 7. As the belt 52 conveys the stack S in the direction of the arrow a of Fig. 7, the foremost box B engages and lifts the arm 58 causing the rod 58 to rotate so as to raise the arms 60 on the ends thereof, the arm 59 being retained in this position by the boxes B until the last one thereof is discharged from the stack receiver 12.

The fruit of each of the boxes B is dumped onto the chute 140 as the boxes pass over the pulley 51 and gravitate to the position shown in Fig. 8. When in this position, the ends of the box strike the belts 133 of the conveyor 116, the box being then completely inverted and lifted up onto the conveyor 116 by engagement of the rotating discs 144 with the ends of the box as shown in Figs. 9 and 10. The empty boxes are carried across the inverting unit 14 by the conveyor 116 and discharged onto a suitable conveyor 176. The fruit dumped onto the chute 140 is received by the conveyor 117 and carried to a soaking tank (not shown) which is the first unit of the apparatus for preparing the fruit for market.

When the stack receiver 12 swings downward, the conveyor 90 of the stack inclining mechanism 13 is restored to horizontal position by contraction of the springs 106 which rotate the shaft 100 causing the arms 104 to lift the conveyor 90 until the bar 94 is engaged and latched in place as shown in Fig. 5 by the arm 98.

In addition to restoring the conveyor 90 from inclined to horizontal position, the arms 104 also function to retain the conveyor 90 in horizontal position under certain conditions in the following manner. When the receiver 12 swings downward to dump a stack, the lower extremities of the angle iron bars 48 are raised out of contact with the levers 112 (shown in Figs. 3 and 4) causing the notched fingers 102 to come to rest on the upper edge of the transverse angle iron bar 96. Then, when the conveyor 90 is restored to horizontal position by contraction of the springs 106, the notches 103 of the fingers 102 engage the upper edge of the angle iron bar 96 so as to retain the arms 104 in their uppermost positions when the arm 98 is swung leftward by the advancing on the conveyor 165 of the next stack to be dumped as shown in Fig. 13.

When the receiver 12 returns to upright position, the extremities of the angle iron bars 48 actuate the levers 112 which lift the fingers 102 out of engagement with the bar 96 permitting the conveyor 90 to drop to inclined position causing the stack thereon to fall into the stack receiver 12 as shown in Fig. 6.

When the last box is discharged from the stack receiver 12, the arm 59 drops thus rotating the rod 58 and causing the arms 60 to strike the latch arms 20, the latter being thereby swung in a clockwise direction as viewed in Fig. 7 so that the teeth 21 thereof move out from over the angle brackets 41. The stack receiver 12 is then swung to its upright position shown in Fig. 1 by expansion of the spring 29, the latter sliding the shaft 27 so that the chain 45 attached thereto pulls on the arm 43 of the receiver 12.

Although I have shown and described but one preferred form of my invention, it is to be understood that various modifications and changes might be made therein without departing from the spirit of the invention or the scope of the appended claims.

I claim as my invention:

1. In a machine for dumping the fruit from a stack of loaded field boxes, the combination of: a frame; stack receiving means pivotally mounted on said frame, said stack receiving means having a substantially vertical stack receiving position and a substantially horizontal box discharging position; means for yieldably urging said stack receiving means to said substantially vertical position; a conveyor for delivering a stack of boxes to said stack receiving means; means for causing a stack on said conveyor to become unbalanced so as to cause said stack to fall into said stack receiving means, said stack receiving means moving to said horizontal position in response to receiving said stack; a conveyor on said stack receiving means for moving said stack of boxes toward the discharge end of said stack receiving means; and means for overturning each box as it is discharged from said stack receiving means.

2. A combination as in claim 1 in which latch means is provided to retain said stack receiving means in said horizontal position; and means for unlatching said latch means in response to the discharge of the last box of a stack from said stack receiving means.

3. A combination as in claim 1 in which control means is provided to permit said stack overbalancing means to function only when said stack receiving means is in said vertical position.

4. In a stack dumping machine, the combination of: a stack disassembling conveyor pivotally supported at its lower end, said conveyor being adapted to receive a stack of loaded boxes when said conveyor is in substantially upright position, and to tilt about said pivot to a substantially reclining position; means to deliver a loaded stack of boxes to a position adjacent to the aforesaid disassembling conveyor; means responsive to said delivery for causing said stack to become overbalanced so as to cause the latter to tilt towards, and the weight of said stack to be thrown against said conveyor with sufficient force to cause said conveyor to swing from stack receiving position to its reclining position; and power means for causing said stack to travel toward the discharge end of said conveyor when the latter is in reclining position to dump the boxes of the stack successively from the discharge end of said conveyor.

5. In a stack handling machine the combination of: a stack feed means adapted to carry a row of stacks of boxes or the like and deliver these in succession to a given point; a draper supporting frame; means for pivotally supporting said frame at its lower end about an axis adjacent said point of delivery; a draper provided on said frame; means for lifting said frame to a substantially upright position when said draper is empty; means for causing a stack of boxes located at said point of delivery to become overbalanced when said frame is in said upright position to cause said stack to tilt against said draper and by its weight overcome said frame lifting means and cause said frame and draper to be swung downwardly into a substantially reclining position; means for lifting the lowermost box in said stack to cause said box to rest on said draper when the latter has reached the aforesaid reclining position; and means for transmitting motion to said draper to cause the latter to feed the boxes of the stack resting thereon successively from the upper end of said draper.

6. In a stack handling machine the combination of: a stack feed means adapted to carry a row of stacks of boxes or the like and deliver these in succession to a given point; a draper supporting frame; a shaft adjacent said point of delivery for pivotally supporting the lower end of said frame; a draper provided on said frame; means for swinging said frame about said shaft to a substantially upright position when said draper is empty; means for causing a stack of boxes located at said point of delivery to become overbalanced when said frame is in said upright position to cause said stack to tilt against said draper and by its weight overcome said frame lifting means and cause said frame and draper to be swung downwardly into a substantially reclining position; means for lifting the lowermost box in said stack to cause said box to rest on said draper when the latter has reached the aforesaid reclining position; and means for transmitting motion through said shaft to said draper to cause the latter to feed the boxes of the stack resting thereon successively from the upper end of said draper.

7. A combination as in claim 6 in which said draper includes an endless belt member, a driven pulley and a drive pulley, said driven pulley being pivotally mounted at the upper end of said frame and said drive pulley being mounted on said shaft.

8. In a stack handling machine the combination of: a stack feed means adapted to carry a row of stacks of boxes or the like and deliver these in succession to a given point; means for supporting each of said stacks when it arrives at said point of delivery; an individual stack conveyor; means for pivotally supporting said conveyor at one end thereof on an axis adjacent said point; means for yieldably swinging said conveyor into a substantially upright position when said conveyor is empty; and means actuated by the upward swinging of said conveyor to cause said support means to rock, thereby tilting the stack supported thereon against said conveyor with sufficient force to swing said conveyor downwardly about said axis into a substantially reclining position to permit the successive discharge of the boxes in said stack from said conveyor.

9. In a stack handling machine the combination of: a stack feed means adapted to carry a row of stacks of boxes or the like and deliver these in succession to a given point; means for supporting each of said stacks when it arrives at said point of delivery; an individual stack conveyor; means for pivotally supporting said conveyor at one end thereof on an axis adjacent said point; means for yieldably swinging said conveyor into a substantially upright position when said conveyor is empty; means actuated by the upward swinging of said conveyor to cause said support means to rock, thereby tilting the stack supported thereon against said conveyor with sufficient force to swing said conveyor downwardly about said axis into a substantially reclining position to permit the successive discharge of the boxes in said stack from said conveyor; and means provided on the lower end of said conveyor to swing upwardly when said conveyor is swung downwardly so as to lift the lowermost box of the stack lying against said conveyor and retain said lowermost box on said conveyor as the latter swings into its reclining position.

10. A combination as in claim 8 in which means is provided on said conveyor for propelling thereover the boxes of the stack supported thereon when said conveyor is in reclining position.

11. In a box dumping machine the combination of: means for receiving fruit dumped from boxes; means disposed above said fruit receiving means for receiving empty boxes; means for feeding boxes to a position for dumping the contents of these boxes into said fruit receiving means; a pair of wheels disposed opposite the ends of a box when disposed in said dumping position and spaced apart so that their peripheries tangentially engage opposite end faces of said box; and means for rotating said wheels to cause the latter to at least complete the inversion of said box and the dumping of the contents therefrom and to shift the empty box on to said empty box receiving means.

12. In a box dumping machine the combination of: fulcrum means adjacent a box dumping position and by which the boxes are adapted to be rocked to effect the dumping of the contents therefrom; means for delivering a box into proximity with said fulcrum means; and a pair of rotary elements disposed for tangentially engaging opposite end faces of said box to rock said box about said fulcrum means to effect the discharge of the fruit from the box by gravity.

13. A combination as in claim 12 in which said fulcrum means comprises a pair of conveyors disposed substantially beneath the ends of said box and adapted to convey the empty box away from said dumping position.

14. In a box dumping machine the combination of: fulcrum means adjacent a box dumping position and by which the boxes are adapted to be rocked to effect the dumping of the contents therefrom; means for delivering a box into proximity with said fulcrum means; and a pair of rotary elements rotating about upright axes and disposed for tangentially engaging opposite end faces of said box to rock said box about said fulcrum means to effect the discharge of the fruit from the box by gravity.

15. In a box dumping machine the combination of: fulcrum means adjacent a box dumping position and by which the boxes are adapted to be rocked to effect the dumping of the contents therefrom; means for delivering a box into proximity with said fulcrum means; and a pair of rotary elements rotating about substantially parallel axes and disposed for tangentially engaging opposite end faces of said box to rock said box about said fulcrum means to effect the discharge of the fruit from the box by gravity.

16. In a box dumping machine the combination of: fulcrum means adjacent a box dumping position and by which the boxes are adapted to be rocked to effect the dumping of the contents therefrom; means for delivering a box into proximity with said fulcrum means; and a pair of rotary elements rotating about substantially parallel upright axes and disposed for tangentially engaging opposite end faces of said box to rock said box about said fulcrum means to effect the discharge of the fruit from the box by gravity.

17. In a stack dumping machine, the combination of: means for receiving a stack of boxes in substantially upright position, and while supporting said stack along the side thereof, permitting said stack to yieldingly rock downwardly with said means into a reclining but upwardly inclined position; means to halt said rocking movement of said stack with the latter in said upwardly inclined position; and means for raising the center of gravity of the stack as a whole along its longitudinal axis to lift each of the boxes thereof to the level of the uppermost box and to discharge the boxes successively from the stack receiving means.

18. In a stack dumping machine the combination of: means for delivering stacks of boxes in upright position successively to a given point; means for causing the foremost of said stacks to fall from upright position in a given direction; and means for receiving each stack thus falling to support said stack and to respond to the momentum of said stack to lower the latter into a substantially reclining position, said last mentioned means lifting the lowermost box in said stack in said operation to position the same upwardly from where it was positioned when said stack started to fall.

19. In a stack dumping machine the combination of: means for delivering stacks of boxes in upright position successively to a given point; means for causing the foremost of said stacks to fall from upright position in a given direction; means for receiving said stack as it falls and rotating said stack about an axis disposed in advance of the center of gravity of said stack when the latter started to fall; and means for conveying the boxes of said stack successively from said stack receiving means.

20. A combination as in claim 19 in which a stack receiving means lowers said stack into an upwardly inclined position, and in which said box conveying means is power operated to lift said boxes in discharging the same from said stack receiving means.

HALE PAXTON.